(12) United States Patent
Nishino et al.

(10) Patent No.: US 7,931,404 B2
(45) Date of Patent: Apr. 26, 2011

(54) BEARING DEVICE AND MOTOR MOUNTED WITH THE BEARING DEVICE

(75) Inventors: Hirotake Nishino, Kanagawa-ken (JP); Masafumi Mizuno, Kanagawa-ken (JP)

(73) Assignee: Alphana Technology Co., Ltd., Shizuoka (JP)

( * ) Notice: Subject to any disclaimer, the term of this patent is extended or adjusted under 35 U.S.C. 154(b) by 456 days.

(21) Appl. No.: 12/149,232

(22) Filed: Apr. 29, 2008

(65) Prior Publication Data

US 2008/0290246 A1 Nov. 27, 2008

(30) Foreign Application Priority Data

May 21, 2007 (JP) .................................. 2007-134559

(51) Int. Cl.
*F16C 32/06* (2006.01)
*F16C 27/06* (2006.01)
(52) U.S. Cl. ........................................ 384/100; 384/215
(58) Field of Classification Search .................. 384/100, 384/107, 120, 123, 276, 290–291, 215; 310/67 R, 310/90
See application file for complete search history.

(56) References Cited

U.S. PATENT DOCUMENTS

| | | | | |
|---|---|---|---|---|
| 2,283,263 A * | 5/1942 | Kates | ............................. | 415/197 |
| 3,682,346 A * | 8/1972 | Sterrett | ........................ | 220/562 |
| 4,558,960 A * | 12/1985 | Lehtinen et al. | ............... | 384/373 |
| 5,596,235 A * | 1/1997 | Yazaki et al. | .................... | 310/90 |
| 5,663,602 A * | 9/1997 | Shimizu et al. | ............. | 310/67 R |
| 6,250,881 B1 * | 6/2001 | Mordue et al. | ................ | 415/200 |
| 7,021,829 B2 * | 4/2006 | Tamaoka | ....................... | 384/112 |
| 7,431,505 B2 * | 10/2008 | Shibahara et al. | ............ | 384/100 |
| 2004/0145260 A1 | 7/2004 | Tamaoka et al. | | |
| 2004/0213488 A1 * | 10/2004 | Murabe et al. | ................ | 384/100 |
| 2007/0206889 A1 * | 9/2007 | Obara et al. | .................. | 384/100 |

FOREIGN PATENT DOCUMENTS

| | | |
|---|---|---|
| JP | 2003-120662 | 4/2003 |
| JP | 2004-176816 | 6/2004 |
| WO | 2005/124170 | 12/2005 |

* cited by examiner

*Primary Examiner* — Marcus Charles
(74) *Attorney, Agent, or Firm* — Louis Woo

(57) ABSTRACT

A bearing device is composed of a shaft, a sleeve for supporting the shaft so as to be rotatable freely and a housing having a through hole into which the sleeve is inserted. A circumferential groove that extends in a circumferential direction is formed on either one surface of an outer circumferential surface of the sleeve and an inner circumferential surface of the housing. An axial groove that extends approximately in parallel to a central axis of the sleeve is formed on either one surface of the outer circumferential surface of the sleeve and the inner circumferential surface of the housing. The outer circumferential surface of the sleeve is glued to the inner circumferential surface of the housing by adhesive that intervenes in both the circumferential groove and the axial groove.

6 Claims, 12 Drawing Sheets

BEARING DEVICE AND MOTOR MOUNTED WITH THE BEARING DEVICE

BACKGROUND OF THE INVENTION

1. Field of the Invention

This invention relates to a bearing device and a motor mounted with the bearing device, particularly, relates to a technology suitably applied for a bearing device that is mounted on a motor to be installed in disc drive equipment, which drives a recording medium in disciform such as a hard disc and an optical disc to rotate.

2. Description of the Related Art

It has been commonly required for conventional motors to be smaller in dimensions. Particularly, it has been strongly required that a motor to be installed in disc drive equipment, which drives a recording medium in disciform such as a hard disc and an optical disc to rotate, was not only smaller in dimensions but also thinner in thickness.

One example of such a conventional motor is disclosed in the Japanese publication of unexamined patent applications No. 2003-120662.

According to the Japanese publication of unexamined patent applications No. 2003-120662, the motor is provided with the inner sleeve member 48, which supports the shaft part 50 as a slide bearing, and the outer sleeve member 46, wherein the inner sleeve member 48 is fixed on an inner peripheral surface of the outer sleeve member 46. Both the inner and outer sleeve members are fixed integrally by fixing adhesive.

More specifically, the inner sleeve member 48 is provided with the groove 112 for fixing adhesive on an outer peripheral surface in the axial direction. Fixing adhesive is filled in the groove 112, and then the inner sleeve member 48 is fixed to the outer sleeve member 46.

Further, according to another prior art, another motor is also known. The motor is provided with a sleeve, which supports a shaft as a slide bearing, and a housing, wherein the sleeve is fixed on an inner peripheral surface of the housing.

Furthermore, in the motor, a circumferential groove is provided on an inner peripheral surface of the housing or on an outer peripheral surface of the sleeve.

More, fixing adhesive is filled in the circumferential groove, and then the sleeve and the housing are fixed integrally.

In reference to FIGS. 10a-12, a motor provided with a sleeve and a housing either one of which is provided with a circumferential groove is briefly described next.

FIG. 10a is a side elevation view of a first sleeve having no circumferential groove on an outer peripheral surface of the first sleeve according to a first prior art.

FIG. 10b is a cross sectional view of a first housing having a circumferential groove on an inner peripheral surface of the first housing according to the first prior art.

FIG. 11a is a side elevation view of a second sleeve having a circumferential groove on an outer peripheral surface of the second sleeve according to a second prior art.

FIG. 11b is a cross sectional view of a second housing having a circumferential groove on an inner peripheral surface of the second housing according to the second prior art.

FIG. 12 is a cross sectional view of the second sleeve and housing shown in FIGS. 11a and 11b, which are fixed integrally by fixing adhesive.

In FIG. 10a, a first sleeve 105A is provided with an outer peripheral surface 105Aa and no groove to be formed on the outer peripheral surface 105Aa.

In FIG. 10b, a circumferential groove 102A is formed on an inner peripheral surface 104Aa of a first housing 104A.

The first sleeve 105A shown in FIG. 10a is inserted into the first housing 104A so as to confront the outer peripheral surface 105Aa of the first sleeve 105A with the inner peripheral surface 104Aa of the first housing 104A. The first sleeve 105A is fixed to the first housing 104A by means of not shown fixing adhesive filled in the circumferential groove 102A.

On the other hand, in FIG. 11a, two circumferential grooves 103B1 and 103B2 (hereinafter generically referred to as "circumferential groove 103B") are formed on an outer peripheral surface 105Ba of a second sleeve 105B while the two circumferential grooves 103B1 and 103B2 are disposed so as to be apart from each other in an axial direction. In FIG. 11b, two circumferential grooves 102B1 and 102B2 (hereinafter generically referred to as "circumferential groove 102B") are formed on an inner peripheral surface 104Ba of a second housing 104B while the two circumferential grooves 102B1 and 102B2 are disposed so as to be apart from each other in the axial direction.

Further, the second sleeve 105B is inserted into the second housing 104B so as to confront the outer peripheral surface 105Ba of the second sleeve 105B with the inner peripheral surface 104Ba of the second housing 104B. The second sleeve 105B is fixed to the second housing 104B by means of not shown fixing adhesive filled in the circumferential grooves 102B and 103B.

As shown in FIG. 12, the circumferential groove 103B of the second sleeve 105B confronts with the circumferential groove 102B of the second housing 104B and room 106 is formed across the second sleeve 105B and the second housing 104B when the second sleeve 105B is inserted into the second housing 104B. Fixing adhesive 107 is filled in the room 106. Filling the fixing adhesive 107 in the room 106 makes adhesive strength between the second sleeve 105B and the second housing 104B improve more while the adhesive strength is coupled with shearing strength of the fixing adhesive 107.

In the meantime, a number of major component parts constituting a bearing of a conventional motor has been four, that is, a sleeve, a shaft, a flange and a hub, wherein the flange will be described as a thrust ring. However, a motor having a complicated structure has been developed recently so as to obtain sufficient dynamic characteristics of a motor even though the motor has been minimized in dimensions and thinned in thickness.

More specifically, many conventional motors mounted with a bearing that is constituted by five component parts have been proposed. In such a bearing, the housing for fixing the sleeve mentioned in the prior arts has been added in addition to the four major component parts mentioned above.

On the contrary, a natural vibration frequency of a motor fluctuates as a number of component parts of a bearing increases. By the fluctuation of vibration frequencies, a ratio of motors of which resonance frequency is relatively low has been increased in mass production.

In case the resonance frequency of a motor decreases, it possibly occurs that the decreased resonance frequency interferes with a driving frequency of a disc and results in generating extraordinary vibration and noise.

On the other hand, in case disc drive equipment is a hard disc drive to be installed in portable equipment such as a mobile computer, it is required for such a hard disc drive to be able to endure 1000 G of acceleration as a dropping impact-resistant characteristic. In this regard, each member constituting a bearing must be fixed to each other in higher strength.

On the contrary, in the structure of the motor disclosed in the Japanese publication of unexamined patent applications No. 2003-120662, a ratio of adhesion area in the circumferential direction is relatively narrow, and resulting in hardly obtaining sufficient adhesive strength, wherein the inner sleeve member 48 is fixed to the outer sleeve member 46 (rotor hub 8) by filling fixing adhesive in the groove 112.

Further, in the case of a fixing method according to the first prior art shown in FIGS. 10*a* and 10*b* in which the first sleeve 105A is fixed to the first housing 104A by filling the fixing adhesive in the circumferential groove 102A, width in the axial direction of the circumferential groove 102A in which the fixing adhesive contacts with the outer peripheral surface 105Aa of the first sleeve 105A is extremely narrow. Consequently, sufficient adhesive strength is hardly obtained.

In this connection, it has been considered that width of a groove was widened or a number of grooves was increased so as to improve adhesive strength. However, there is a limit to improve adhesive strength. Because engaging length of the first sleeve 105A with the first housing 104A in the axial direction was short due to essential designing concept of thinning the total thickness of a motor.

On the other hand, in the case of another fixing method of the second sleeve 105B to the second housing 104B according to the second prior art shown in FIG. 12, the circumferential grooves 102B and 103B are formed on the inner peripheral surface 104Ba of the second housing 104B and on the outer peripheral surface 105Ba of the second sleeve 105B respectively, and the fixing adhesive 107 is filled in both the circumferential grooves 102B and 103B. As a result, filling the fixing adhesive 107 in the room 106 makes adhesive strength improve in consideration of the shearing strength of the adhesive 107.

However, filling the fixing adhesive 107 in the room 106 is extremely difficult in manufacturing.

More specifically, in case an enough amount of fixing adhesive 107 is filled in the circumferential groove 102B of the second housing 104B so as to fill the room 106 sufficiently and to rise above the inner peripheral surface 104Ba, for instance, the risen amount of the fixing adhesive 107 is shaved off by the outer edge of the second sleeve 105B when the second sleeve 105B is inserted into the second housing 104B.

As a result, a void is generated in the room 106.

Further, even in case the fixing adhesive 107 is filled in both the circumferential grooves 102B and 103B, each of the inner edge of the second housing 104B and the outer edge of the second sleeve 105B shaves off respective fixing adhesive 107 filled in the circumferential grooves 102B and 103B from each other. In this regard, there is a further worry that the shaved-off fixing adhesive 107 attaches to other portions or regions other than the room 106.

Furthermore, in case the fixing adhesive 107 is filled in both the circumferential grooves 102B and 103B, the fixing adhesive 107 must be applied on the second housing 104B and the second sleeve 105B almost simultaneously in consideration of a hardening characteristic of the adhesive 107. Consequently, assembling work of the second housing 104B and the second sleeve 105B becomes harder furthermore.

More, providing the room 106 makes wall thickness of the section of the second housing 104B and the second sleeve 105B remarkably thinner, and resulting in generating further problem such that deflective rigidity as a bearing is deteriorated.

As mentioned above, by the respective fixing methods of the sleeve and the housing according to the prior arts in which fixing adhesive is filled in circumferential grooves that extend in the axial direction or the circumferential direction, it is difficult to improve deflective rigidity in the axial direction or the circumferential direction.

Accordingly, a technology that solves the above-mentioned problems and improves deflective rigidity furthermore has been desired.

SUMMARY OF THE INVENTION

Accordingly, in consideration of the above-mentioned problems of the prior arts, an object of the present invention is to provide a bearing device and a motor mounted with the bearing device, which is high in adhesive strength between a housing and a sleeve in the axial and circumferential directions and high in deflective rigidity of the housing and the sleeve that are glued together.

In order to achieve the above object, the present invention provides, according to an aspect thereof, a bearing device comprising: a shaft; a sleeve for supporting the shaft so as to be rotatable freely; and a housing having a through hole into which the sleeve is inserted, wherein a circumferential groove extending in a circumferential direction is formed on either one surface of an outer circumferential surface of the sleeve and an inner circumferential surface of the housing that confronts with the outer circumferential surface of the sleeve, and wherein an axial groove that extends approximately in parallel to a central axis of the sleeve is formed on either one surface of the outer circumferential surface of the sleeve and the inner circumferential surface of the housing, and further wherein the outer circumferential surface of the sleeve is glued to the inner circumferential surface of the housing by adhesive that intervenes in both the circumferential groove and the axial groove.

Other object and further features of the present invention will be apparent from the following detailed description when read in conjunction with the accompanying drawings.

DETAILED DESCRIPTION OF THE INVENTION

Figures 1A, 1B:
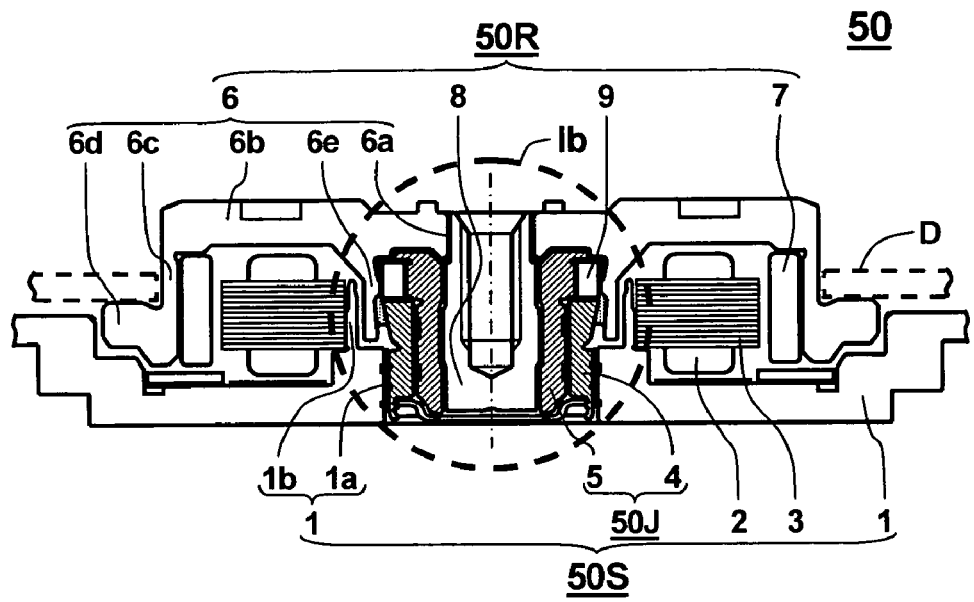
FIG. 1*a* is a cross sectional view of a motor mounted with a bearing device according to a preferred embodiment of the present invention.
FIG. 1*b* is an enlarged cross sectional view of the motor with enlarging a circled area "1*b*" in FIG. 1*a*.

In reference to FIGS. 1a and 1b, a motor mounted with a bearing device according to a preferred embodiment of the present invention is described in detail first, wherein the motor is common to each embodiment of the present invention.

FIG. 1a is a cross sectional view of a motor mounted with a bearing device according to a preferred embodiment of the present invention.

FIG. 1b is an enlarged cross sectional view of the motor with enlarging a circled area "1b" in FIG. 1a.

In FIG. 1a, a motor 50 is such a motor that is installed in an optical disc drive and drives a hard disc to rotate. The motor 50 is essentially composed of a stator 50S and a rotor 50R.

As shown in FIG. 1a, the stator 50S is further composed of a motor base 1, a coil 2, a core 3, a housing 4 and a sleeve 5. The motor base 1 has a through hole 1a in the middle and a circular wall section 1b that rises around the through hole 1a. The coil 2 is wound around the core 3 and the core 3 is fixed to an outer circumferential section of the circular wall section 1b.

Further, the housing 4 is fixed to the through hole 1a.

Furthermore, the sleeve 5 is fixed to the housing 4.

More specifically, as shown in FIG. 1b, an outer circumferential surface 5a of the sleeve 5 is affixed to an inner circumferential surface 4a of the housing 4, wherein the outer circumferential surface 5a of the sleeve 5 confronts with the inner circumferential surface 4a of the housing 4.

Hereupon, the housing 4 and the sleeve 5 are made of brass and constitute a bearing device 50J in the radial direction.

Further, a flange section 5f that protrudes outward is formed on one end portion or top end portion of the sleeve 5 opposite to the motor base 1 side.

On the other hand, as shown in FIG. 1a, the rotor 50R is further composed of a hub 6 and a ring magnet 7. The hub 6 is provided with a base section 6b that is formed in approximately a circular shape, a through hole 6a that is bored in the base section 6b and a circular wall section 6c that is provided at an outer circumferential edge of the base section 6b. The ring magnet 7 is fixed to an inner wall surface of the circular wall section 6c.

Further, a flange section 6d that protrudes outward from the circular wall section 6c is formed at a tip end section of the circular wall section 6c, wherein a disc "D" is loaded on the flange section 6d. In this connection the disc "D" is clamped on the hub 6 by means of a not shown clamping device.

Furthermore, as shown in FIG. 1b, a shaft 8 is force fitted into the through hole 6a of the hub 6. Then the shaft 8 is inserted into a through hole 5k of the sleeve 5.

More, as shown in FIGS. 1a and 1b, an inner circular wall section 6e of which diameter is smaller than that of the circular wall section 6c is formed on the hub 6 in concentric with the through hole 6a.

A thrust ring 9 is fixed on an inner circumferential surface of the inner circular wall section 6e. As shown in FIG. 1b, the thrust ring 9 is wedged between a top end surface 4j of the housing 4 and a bottom end surface 5f1 of the flange section 5f of the sleeve 5 while minute gaps are retained among them.

Further, a thrust plate 10 is fixed to an opening section of the housing 4 on the bottom so as to cover an bottom opening of the sleeve 5 and a tip end surface 8a of the shaft 8 as shown in FIG. 1b.

A thrust dynamic pressure groove (not shown) is formed on a top surface of the thrust ring 9, which confronts with the bottom end surface 5f1 of the sleeve 5, and a bottom surface of the thrust ring 9, which confronts with the top end surface 4j of the housing 4, respectively.

In FIG. 1b, thrust dynamic pressure bearing sections SB1 and SB2 are constituted by each thrust dynamic pressure groove formed on the top and bottom surfaces of the thrust ring 9, the bottom end surface 5f1 of the sleeve 5, the top end surface 4j of the housing 4 and lubricant 11 that is filled in the minute gaps among the trust ring 9, the housing 4 and the sleeve 5.

On the other hand, a pair of radial dynamic pressure grooves (not shown) is formed on an inner circumferential surface of the sleeve 5 so as to be apart from each other in a central axis CL direction, wherein the central axis CL is also a rotational axis of the rotor 50R.

As shown in FIG. 1b, radial dynamic pressure bearing sections RB1 and RB2 are constituted by each radial dynamic pressure groove, an outer circumferential surface 8b of the shaft 8 that confronts with the radial dynamic pressure grooves and the lubricant 11 that is filled in a gap between the sleeve 5 and the shaft 8.

The lubricant 11 is filled in a gap route that goes from a taper seal section TS to a gap between the tip end surface 8a of the shaft 8 and the thrust plate 10 as a remotest section through the thrust dynamic pressure bearing section SB2, a gap between the sleeve 5 and the thrust ring 9, the thrust dynamic pressure bearing section SB1, a gap between a top end surface 5j of the sleeve 5 and an inside surface 6f of the hub 6 and the radial dynamic pressure bearing sections RB1 and RB2. In this connection, a fluid level 11a of the lubricant 11 positions in the middle of the taper seal section TS.

By the above-mentioned construction of the motor 50, the rotor 50R rotates with respect to the stator 50S when electricity is supplied to the coil 2 from outside through a not shown printed circuit board.

In this regard, the rotor 50R is supported so as to be rotatable freely with respect to the stator 50S while the rotor 50R is floated by dynamic pressure generated by each of the dynamic pressure grooves as the rotor 50R rotates.

In reference to FIGS. 2a-9b, the bearing device 50J in which the sleeve 5 is glued to the housing 4 by adhesive is detailed in accordance with each embodiment of the present invention next.

Further, in each embodiment, an alphabetic character in capital letters is suffixed to a reference sign of the housing 4 and the sleeve 5 so as to identify a bearing device according to each embodiment of the present invention clearly.

First Embodiment

Figure 2A:
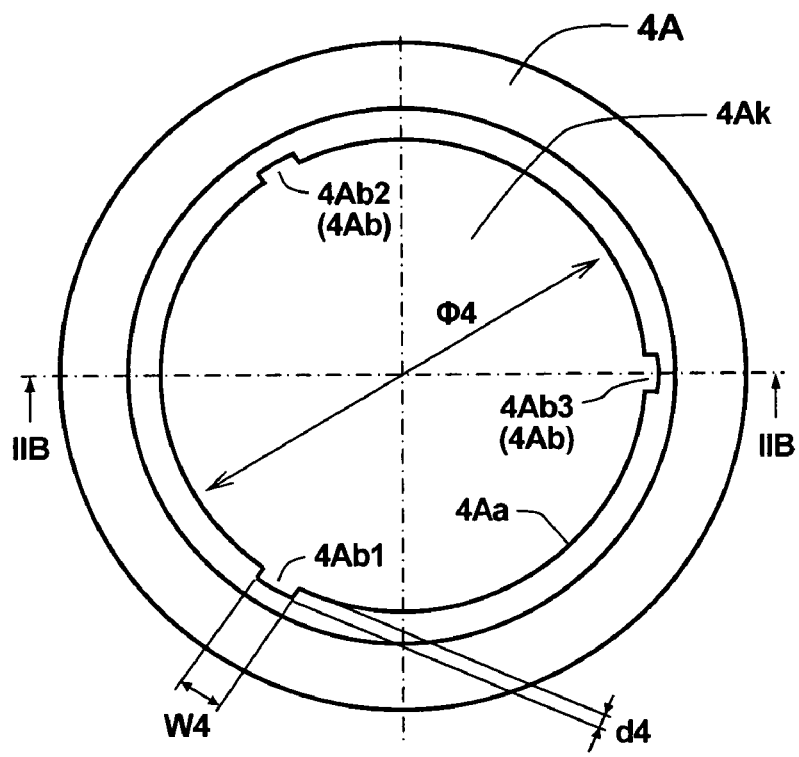
FIG. 2*a* is a plan view of a housing of a first bearing device according to a first embodiment of the present invention.

FIG. 2a is a plan view of a housing 4A of a first bearing device according to a first embodiment of the present invention.

Figure 2B:
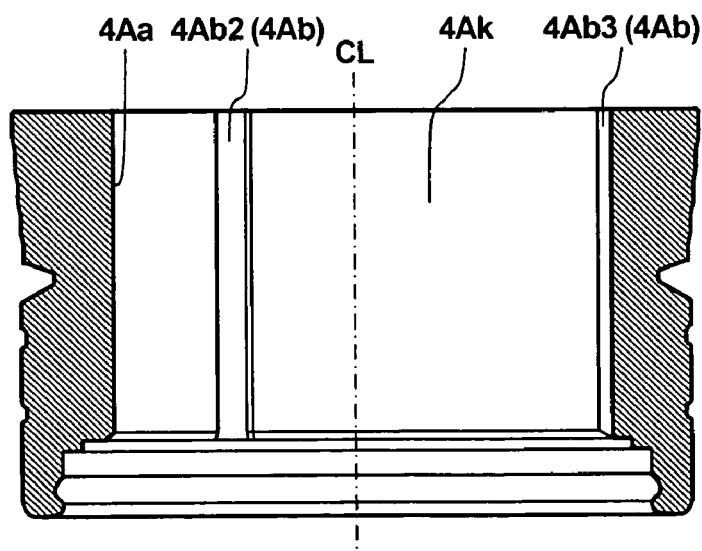
FIG. 2*b* is a cross sectional view of the housing taken along line IIB-IIB in FIG. 2*a*.

FIG. 2b is a cross sectional view of the housing 4A taken along line IIB-IIB in FIG. 2a.

Figure 3:
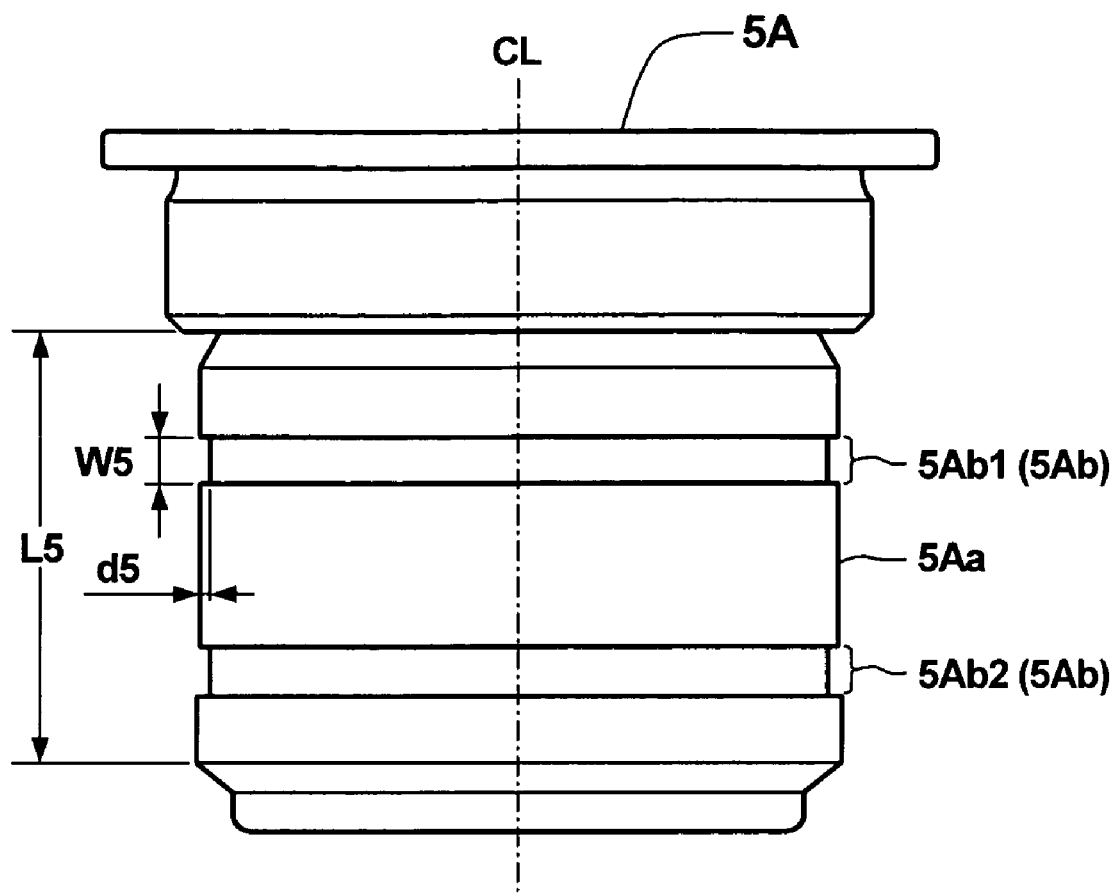
FIG. 3 is a side elevation view of a sleeve of the first bearing device according to the first embodiment of the present invention.

FIG. 3 is a side elevation view of a sleeve 5A of the first bearing device according to the first embodiment of the present invention.

Figure 4A:
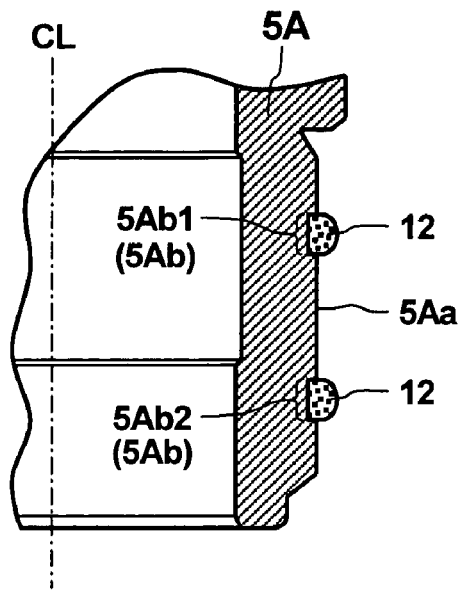
FIG. 4*a* is a cross sectional view in part of the sleeve shown in FIG. 3 for explaining a first step of installing the sleeve in the housing shown in FIG. 2*a* according to the first embodiment of the present invention.

FIG. 4a is a cross sectional view in part of the sleeve 5A shown in FIG. 3 for explaining a first step of installing the sleeve 5A in the housing shown in FIG. 2a according to the first embodiment of the present invention.

Figure 4B:
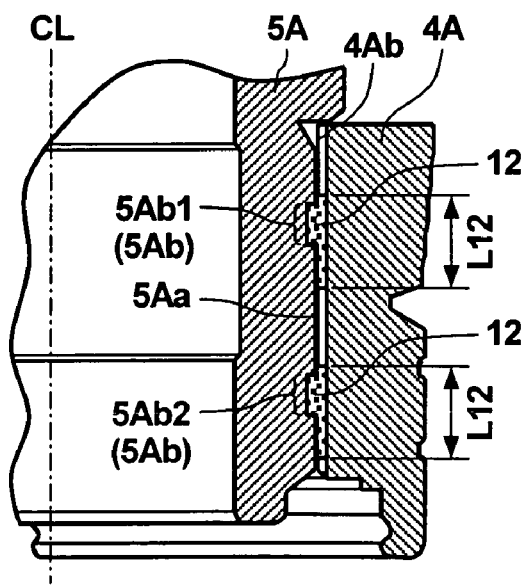
FIG. 4*b* is an explanatory cross sectional view exhibiting a second step of installing the sleeve shown in FIG. 4*a* in the housing shown in FIG. 2*b* according to the first embodiment of the present invention.

FIG. 4b is an explanatory cross sectional view exhibiting a second step of installing the sleeve 5A shown in FIG. 4a in the housing 4A shown in FIG. 2b according to the first embodiment of the present invention.

As shown in FIGS. 2a and 2b, the housing 4A is provided with a through hole 4Ak and three grooves 4Ab1-4Ab3 (hereinafter generically referred to as "groove 4Ab") formed on an inner circumferential surface 4Aa. The groove 4Ab is formed so as to extend in a direction approximately in parallel with the central axis CL, wherein the central axis CL is a rotational axis of the shaft 8 or the rotor 50R. In this regard, the groove 4Ab is also referred to as "axial groove 4Ab" in some cases.

In the first embodiment of the present invention, the three axial grooves 4Ab1-4Ab3 having a cross section in a rectangular shape are formed at an equiangular interval in the circumferential direction by a cutting process.

More specifically, in FIG. 2a, dimensions of the rectangular shape are such that width W4 in the circumferential direction is 0.5 mm and depth d4 is 0.5 mm. The width W4 is approximately 1.4% of circumferential length of the inner circumferential surface 4Aa of the housing 4A, and the depth d4 is approximately 0.7% of an inner diameter Φ4 of the through hole 4Ak of the housing 4A.

Further, in the first embodiment of the present invention, total width of the three axial grooves 4Ab1-4Ab3, that is, three times the width W4 (3×W4) is approximately 4.2% of the circumferential length of the inner circumferential surface 4Aa of the housing 4A. In this connection, a value of the total width is desirable to be within a range from 4.1 to 4.3%.

In FIG. 3, the sleeve 5A is provided with two circumferential grooves 5Ab1 and 5Ab2 (hereinafter generically referred to as "circumferential groove 5Ab") having a cross section in a rectangular shape formed on an outer circumferential surface 5Aa of the sleeve 5. The circumferential grooves 5Ab1 and 5Ab2 extend in the circumferential direction and are disposed so as to be apart from each other in the central axis CL direction.

More specifically, in FIG. 3, dimensions of the rectangular shape are such that width W5 in the central axis CL direction is 0.5 mm and depth d5 is 0.5 mm. The width W5 is approximately 6.1% of axial length L5 of the outer circumferential surface 5Aa of the sleeve 5A, wherein the axial length L5 is equivalent to a range that confronts with the inner circumferential surface 4Aa of the housing 4A when the sleeve 5A is inserted into the through hole 4Ak of the housing 4A.

Further, the depth d5 is approximately 0.7% of the inner diameter Φ4 of the through hole 4Ak of the housing 4A.

Furthermore, in the first embodiment of the present invention, total width of the two circumferential grooves 5Ab1 and 5Ab2, that is, twice the width W5 (2×W5) is approximately 12.2% of the axial length L5 of the outer circumferential surface 5Aa of the sleeve 5A. In this connection, a value of the total width is desirable to be within a range from 11.8 to 12.6%.

In reference to FIGS. 4a and 4b, steps of gluing the sleeve 5A to the housing 4A so as to assemble the first bearing device are described in detail next.

Firstly, as shown in FIG. 4a, adhesive 12 is filled in the circumferential grooves 5Ab1 and 5Ab2.

It is essential for the adhesive 12 to be stable in material properties, particularly, to be hardly degenerated by the lubricant 11. One of such stable adhesive is EPO-TECH 353ND that is epoxy thermosetting adhesive and manufactured by Epoxy Technology. In this connection, viscosity of the adhesive 353ND is 3,000 to 5,000 [mPa·s].

Further, as shown in FIG. 4a, the adhesive 12 is filled so as to rise over the outer circumferential surface 5Aa as well as filling in the circumferential groove 5Ab.

Secondly, as shown in FIG. 4b, the sleeve 5A is inserted into the through hole 4Ak of the housing 4A from a top end opening section of the through hole 4Ak. By inserting the sleeve 5A into the housing 4A, the adhesive 12 that is filled in the circumferential groove 5Ab and rises over the outer circumferential surface 5Aa permeates a minute gap between the outer circumferential surface 5Aa of the sleeve 5A and the inner circumferential surface 4Aa of the housing 4A. At the same time, the adhesive 12 flows into the axial groove 4Ab formed on the inner circumferential surface 4Aa of the housing 4A by the capillary phenomenon.

Further, the adhesive 12 spreads in the central axis CL direction and is finally filled in the axial groove 4Ab within a range of L12 as shown in FIG. 4b.

Accordingly, adhesive strength of the adhesive 12 is remarkably improved not only in the axial direction but also in the circumferential direction. Because the adhesive 12 flows into the axial groove 4Ab of the housing 4A and spreads in the central axis CL direction even though the adhesive 12 is just filled in the circumferential groove 5Ab of the sleeve 5A.

In the meantime, it is possible to fill the adhesive 12 into both the circumferential groove 5Ab and the axial groove 4Ab. However, filling in the circumferential direction is much easier than filling in the axial direction. Consequently, the above-mentioned filling in the circumferential groove 5Ab only is more excellent in workability.

Further, it is acceptable for the sleeve 5A to be moved vertically in the central axis CL direction once or more as a reciprocating motion so as to inpour the adhesive 12 into the axial groove 4Ab easier when inserting the sleeve 5A into the housing 4A.

By the reciprocating motion, the filling range L12 of the adhesive 12 in the axial groove 4Ab can be extended more, and resulting in improving adhesive strength of the adhesive 12 furthermore.

Second Embodiment

It should be understood that two or more circumferential grooves are preferable for stronger adhesive strength. However, a number of circumferential grooves can be reduced to only one for the purpose of realizing a motor to be thinned in thickness.

In reference to FIGS. 5a-5c, a second bearing device in which a sleeve is provided with only one circumferential groove is described in detail next.

Figure 5A:
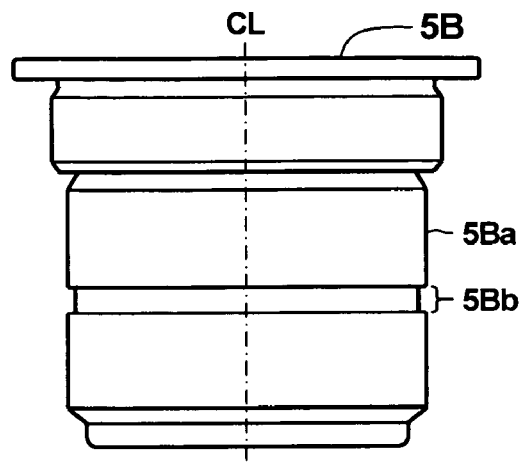
FIG. 5*a* is a side elevation view of a sleeve of a second bearing device according to a second embodiment of the present invention.

FIG. 5a is a side elevation view of a sleeve 5B of a second bearing device according to a second embodiment of the present invention.

Figure 5B:
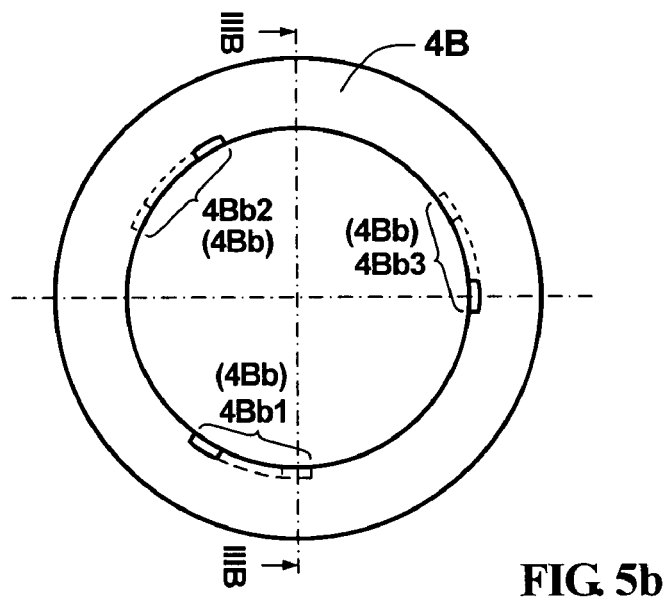
FIG. 5*b* is a plan view of a housing of the second bearing device according to the second embodiment of the present invention.

FIG. 5b is a plan view of a housing 4B of the second bearing device according to the second embodiment of the present invention.

Figure 5C:
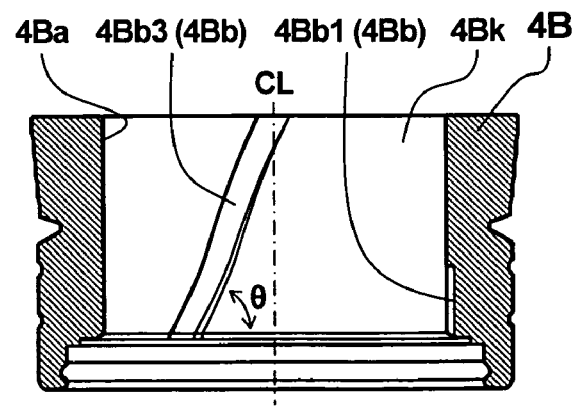
FIG. 5*c* is a cross sectional view of the housing taken along line IIIB-IIIB in FIG. 5*b*.

FIG. 5c is a cross sectional view of the housing 4B taken along line IIIB-IIIB in FIG. 5b.

In FIG. 5a, the sleeve 5B is composed of an outer circumferential surface 5Ba and one circumferential groove 5Bb.

On the other hand, as shown in FIGS. 5b and 5c, the housing 4B is composed of an inner circumferential surface 4Ba, a through hole 4Bk and three axial grooves 4Bb1-4Bb3 (hereinafter generically referred to as "axial groove 4Bb"). As shown in FIG. 5c, the axial groove 4Bb to be formed on the circumferential surface 4Ba is not in parallel to the central axis CL but slanted by an angle θ. It is preferable for the angle θ of gradient of the axial groove 4Bb to be 45 degrees or less with respect to a parallel line on the inner circumferential surface 4Ba that is parallel to the central axis CL.

Further, it is most preferable that the circumferential groove 4Bb is parallel to the central axis CL in the axial direction.

More, the adhesive 12 is filled in the circumferential groove 5Bb of the sleeve 5B as the same manner as the sleeve 5A according to the first embodiment of the present invention shown in FIG. 4a.

Moreover, the sleeve 5B is inserted into the housing 4B, and then the sleeve 5B is glued to the housing 4B as the same manner as the first embodiment of the present invention.

Third Embodiment

In the first and the second embodiments, the axial groove 4Ab or 4Bb of the housing 4A or 4B is formed vertically in the axial direction and the circumferential groove 5Ab or 5Bb of the sleeve 5A or 5B is formed horizontally in the circumferential direction. However, it should be understood that adhesive strength of the adhesive 12 is independent of directions of axial or circumferential grooves to be formed on the housing 4 and the sleeve 5.

In reference to FIGS. 6a and 6b, a third bearing device in which a circumferential groove and an axial groove are formed on a housing and a sleeve respectively is described next.

Figure 6A:
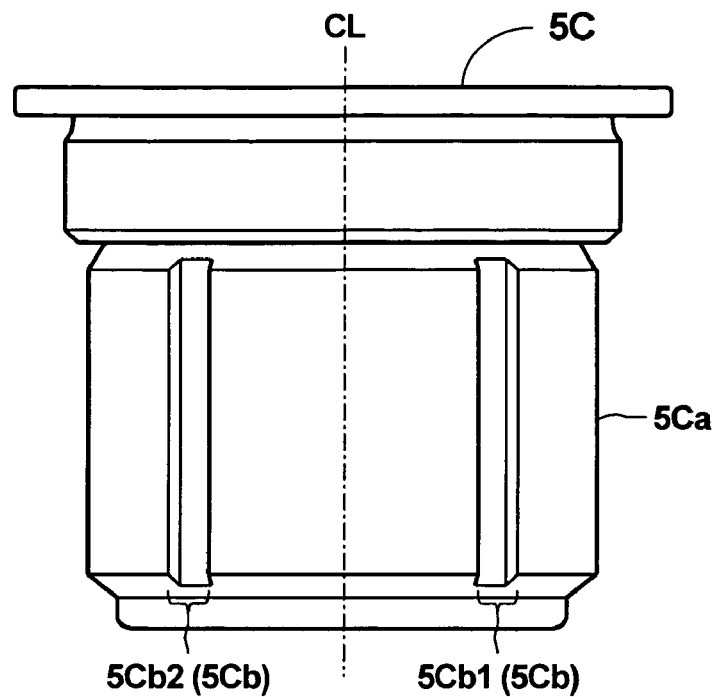
FIG. 6*a* is a side elevation view of a sleeve of a third bearing device according to a third embodiment of the present invention.

FIG. 6a is a side elevation view of a sleeve 5C of a third bearing device according to a third embodiment of the present invention.

Figure 6B:
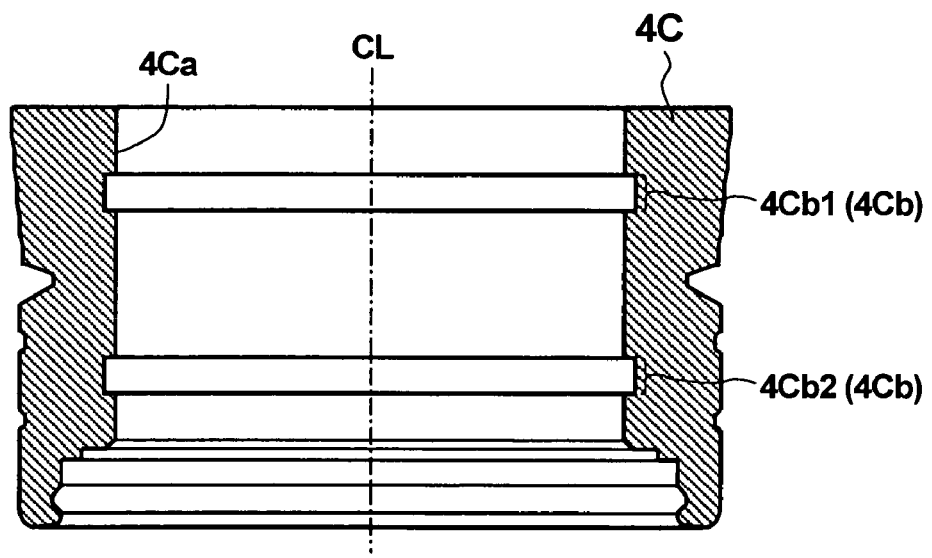
FIG. 6b is a cross sectional view of a housing of the third bearing device according to the third embodiment of the present invention.

FIG. 6b is a cross sectional view of a housing 4C of the third bearing device according to the third embodiment of the present invention.

In FIG. 6a, the sleeve 5C of the third bearing device is composed of an outer circumferential surface 5Ca and a plurality of axial grooves 5Cb1 and 5Cb2 (hereinafter generically referred to as "axial groove 5Cb") formed on the outer circumferential surface 5Ca in the central axis CL direction or the axial direction.

On the other hand, in FIG. 6b, the housing 4C of the third bearing device is composed of an inner circumferential surface 4Ca and two circumferential grooves 4Cb1 and 4Cb2 (hereinafter generically referred to as "circumferential groove 4Cb") formed on the inner circumferential surface 4Ca in the circumferential direction.

As mentioned above, filling adhesive in the circumferential direction is much easier than filling in the axial direction in workability. Consequently, in the case of the third bearing device, adhesive is filled in the circumferential groove 4Cb of the housing 4C as the same manner as the circumferential groove 5Ab of the sleeve 5A shown in FIG. 4a according to the first embodiment of the present invention. Then the sleeve 5C is inserted into the housing 4C.

Further, the adhesive filled in the circumferential groove 4Cb permeates a minute gap between the outer circumferential surface 5Ca of the sleeve 5C and the inner circumferential surface 4Ca of the housing 4C and flows into the axial groove 5Cb by the capillary phenomenon.

Furthermore, the adhesive spreads in the axial groove 5Cb in the central axis CL direction and is finally filled in the axial groove 5Cb.

More, the sleeve 5C is reciprocally moved in the axial direction as the same manner as the housing 4A according to the first embodiment, and resulting in improving adhesive strength of the adhesive furthermore.

Fourth Embodiment

In the first to third embodiment, the circumferential and axial grooves are formed on the housing and the sleeve separately. However, the circumferential and axial grooves can be formed on either one of the housing and the sleeve, and resulting in being also able to improve adhesive strength.

In reference to FIGS. 7a and 7b, a fourth bearing device in which a groove is not formed on a sleeve is described next.

Figure 7A:
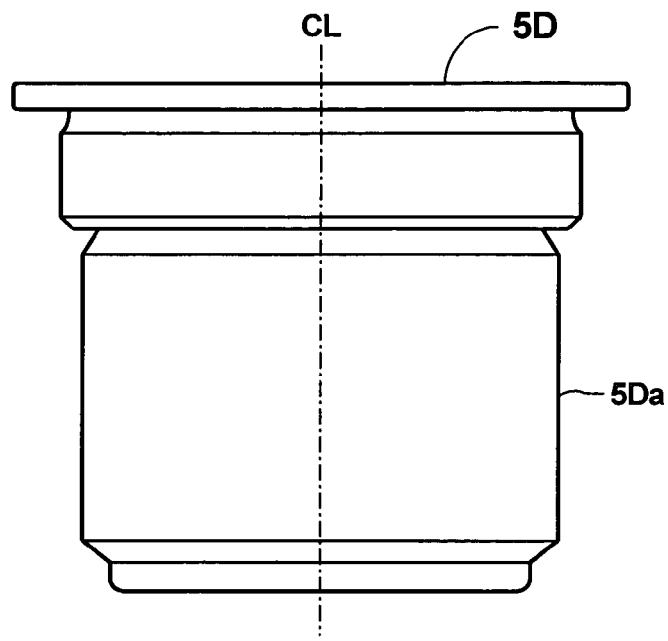
FIG. 7a is a side elevation view of a sleeve of a fourth bearing holder according to a fourth embodiment of the present invention.

FIG. 7a is a side elevation view of a sleeve 5D of a fourth bearing holder according to a fourth embodiment of the present invention.

Figure 7B:
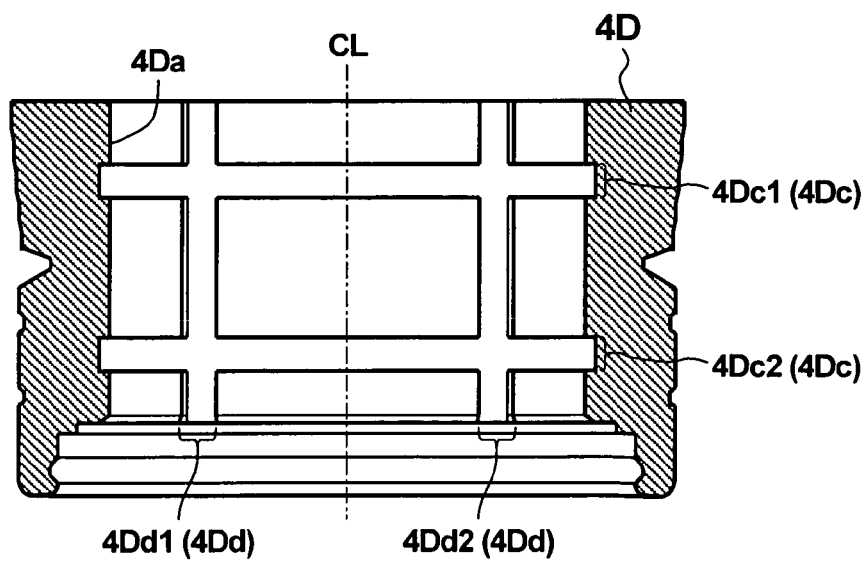
FIG. 7b is a cross sectional view of a housing of the fourth bearing device according to the fourth embodiment of the present invention.

FIG. 7b is a cross sectional view of a housing 4D of the fourth bearing device according to the fourth embodiment of the present invention.

As shown in FIG. 7a, the sleeve 5D is provided with an outer circumferential surface 5Da. However, no groove is formed on the outer circumferential surface 5Da.

On the other hand, as shown in FIG. 7b, the housing 4D is provided with an inner circumferential surface 4Da and a plurality of axial grooves 4Dd1 and 4Dd2 (hereinafter generically referred to as "axial groove 4Dd") as well as two circumferential grooves 4Dc1 and 4Dc2 (hereinafter generically referred to as "circumferential groove 4Dc").

Adhesive is filled in the circumferential groove 4Dc of the housing 4D as the same manner as sleeve 5A of the first embodiment of the present invention, and then the sleeve 5D is inserted in the housing 4D. The adhesive flows and spreads in the axial groove 4Dd as the same manner as that of the first embodiment of the present invention.

Forming the circumferential and axial grooves 4Dc and 4Dd are not processed continuously but intermittently, so that manufacturing efficiency is inferior to that of the first to third embodiments. However, adhesive sufficiently flows into grooves in the axial and circumferential directions.

Accordingly, it is realized for the fourth bearing device that adhesive strength is much stronger than that of the prior arts.

According to the above-mentioned first to fourth embodiments, the housing 4 (4A, 4B, 4C or 4D) and the sleeve 5 (5A, 5B, 5C or 5D) are firmly glued by the adhesive intervening in the grooves formed in the axial and circumferential directions.

Accordingly, it is realized that the adhesive strength is much stronger not only in the axial direction but also in the circumferential direction.

Further, it is achieved that deflective rigidity of the glued housing and the sleeve or the bearing device is higher in strength.

Furthermore, even though adhesive is filled only in a circumferential groove, the adhesive flows into an axial groove and results in making adhesive strength stronger. In this regard, gluing work for a housing and a sleeve is easier and simpler, and resulting in improving workability.

More, a section to be formed with a room, which extends across the housing and the sleeve, is limited to a intersection between a circumferential groove and an axial groove and disposed extremely locally. Therefore, the section hardly deteriorates mechanical strength of a bearing device and the bearing device can achieve remarkable strength in deflective rigidity.

In this connection, a motor mounted with such a bearing device is never increased in a number of component parts, so that the motor is stable in a natural vibration frequency and a resonance frequency of the motor hardly decreases.

Accordingly, the resonance frequency never interferes with a driving frequency of a disc, and resulting in hardly generating remarkable vibration or noise.

Further, a motor mounted with the bearing device exhibits a higher dropping impact-resistant characteristic, so that such a motor is preferably used for a disc driving motor to be installed in mobile equipment.

While the invention has been described above with reference to a specific embodiment thereof, it is apparent that many changes, modifications and variations in configuration, materials and the arrangement of equipment and devices can be made without departing form the invention concept disclosed herein.

For instance, in the above-mentioned first to fourth embodiments, any of the housing 4A, 4B, 4C and 4D can be combined with any of the sleeves 5A, 5B, 5C and 5D.

Further, a location of an axial or circumferential groove and a number of axial or circumferential grooves can be arbitrary designated. However, it is preferable for axial grooves to be disposed in the axial symmetry.

Further, a cross sectional shape of a circumferential groove or an axial groove is not limited to a rectangular shape. Any shape can be applicable.

In reference to FIGS. 8a to 9b, a housing having a groove in a specific shape other than rectangular is briefly described next.

Figure 8A:
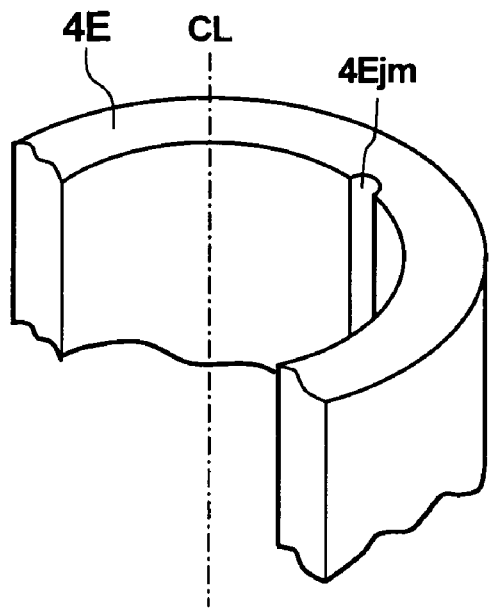
FIG. 8a is a perspective view in part of a housing having an axial groove in an arc shape according to a first variation of the present invention.

FIG. 8a is a perspective view in part of a housing 4E having an axial groove in an arc shape according to a first variation of the present invention.

Figure 8B:
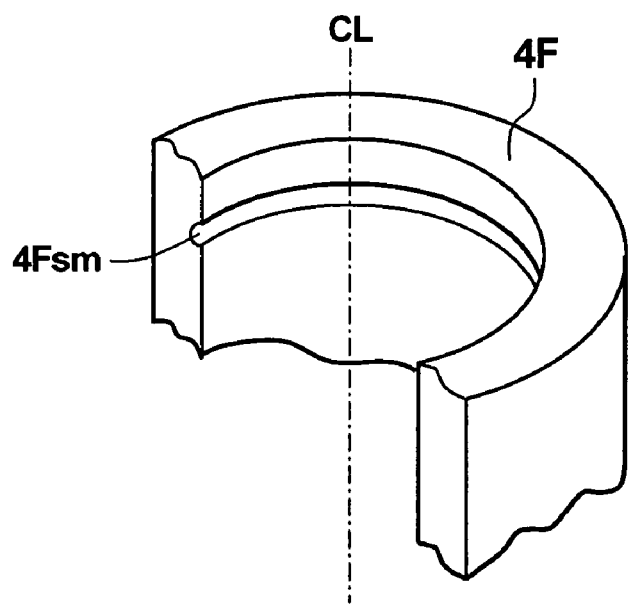
FIG. 8b is a perspective view in part of a housing having a circumferential groove in an arc shape according to a second variation of the present invention.

FIG. 8b is a perspective view in part of a housing 4F having a circumferential groove in an arc shape according to a second variation of the present invention.

Figure 9A:
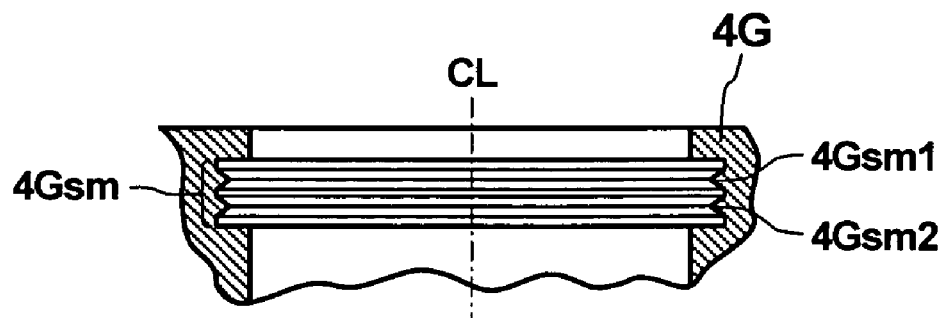
FIG. 9a is a cross sectional view in part of a housing having a circumferential groove in a ragged cross section according to a third variation of the present invention.

FIG. 9a is a cross sectional view in part of a housing 4G having a circumferential groove in a ragged cross section according to a third variation of the present invention.

Figure 9B:
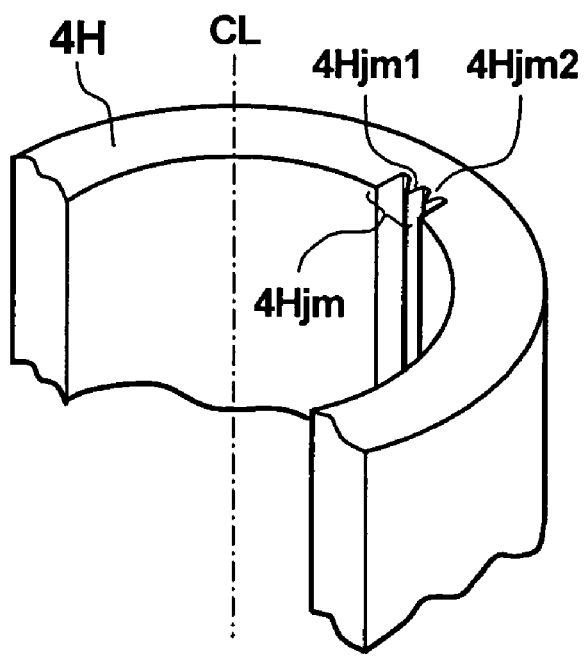
FIG. 9b is a perspective view in part of a housing having an axial groove in a ragged cross section according to a fourth variation of the present invention.
Figure 10A:
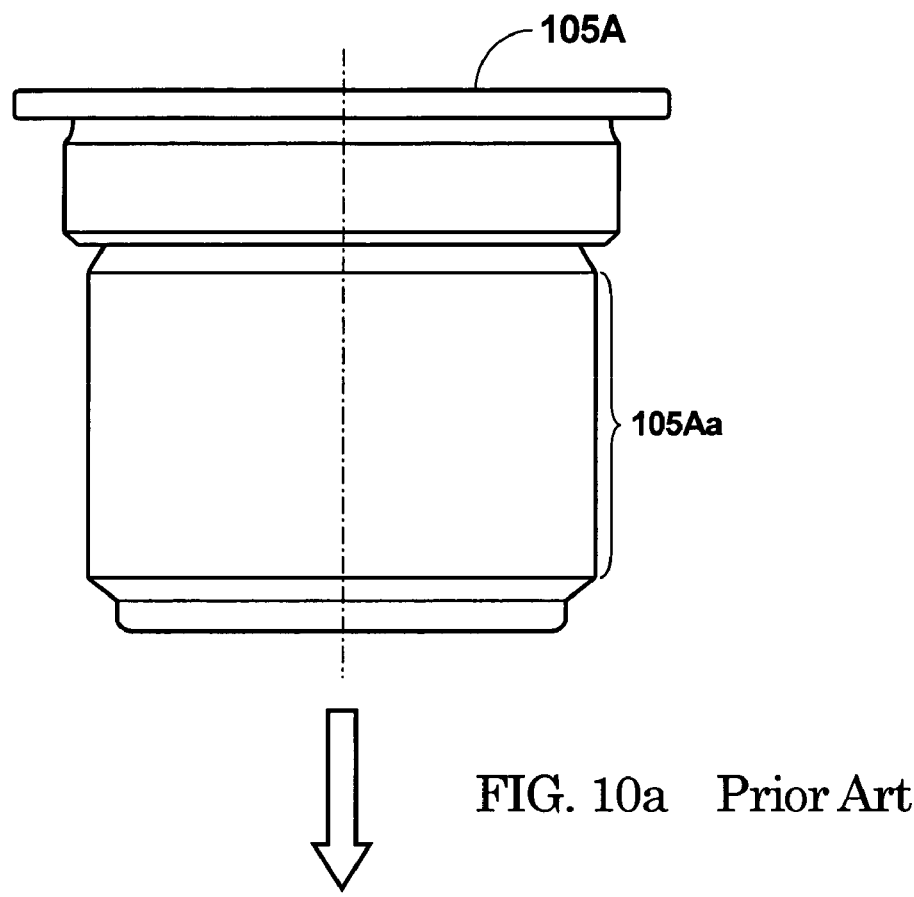
FIG. 10a is a side elevation view of a first sleeve having no circumferential groove on an outer peripheral surface of the sleeve according to a first prior art.
Figure 10B:
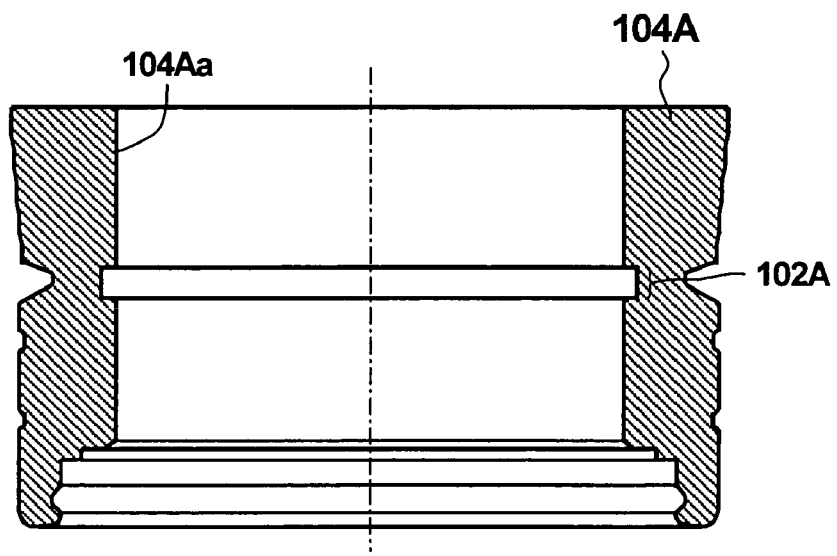
FIG. 10b is a cross sectional view of a first housing having a circumferential groove on an inner peripheral surface of the first housing according to the first prior art.
Figure 11A:
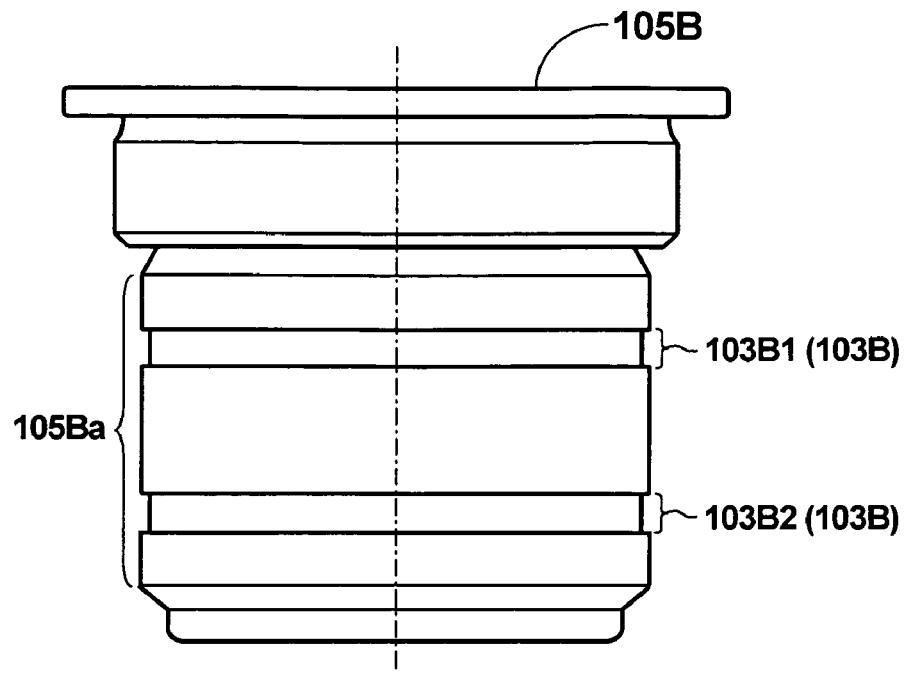
FIG. 11a is a side elevation view of a second sleeve having a circumferential groove on an outer peripheral surface of the other sleeve according to a second prior art.
Figure 11B:
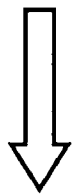
FIG. 11b is a cross sectional view of a second housing having a circumferential groove on an inner peripheral surface of the second housing according to the second prior art.
Figure 11B:
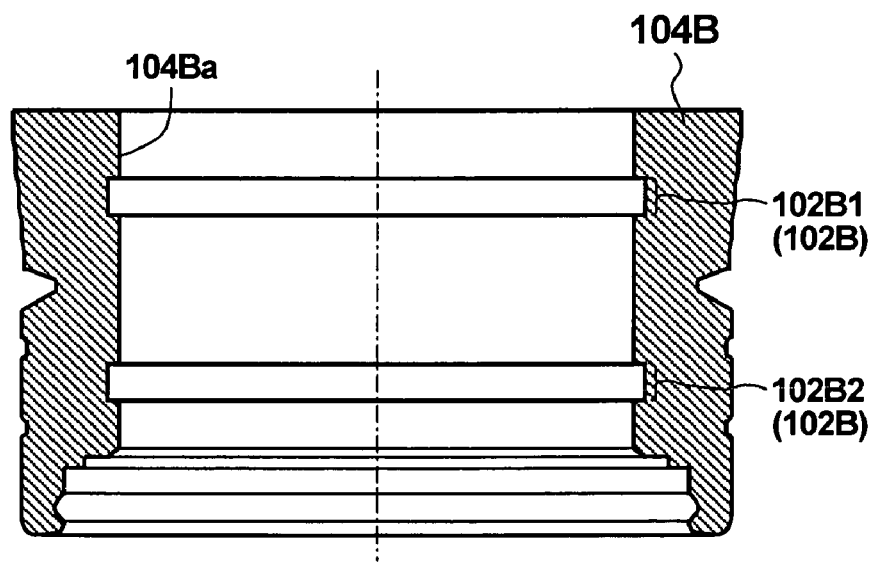
Figure 12:
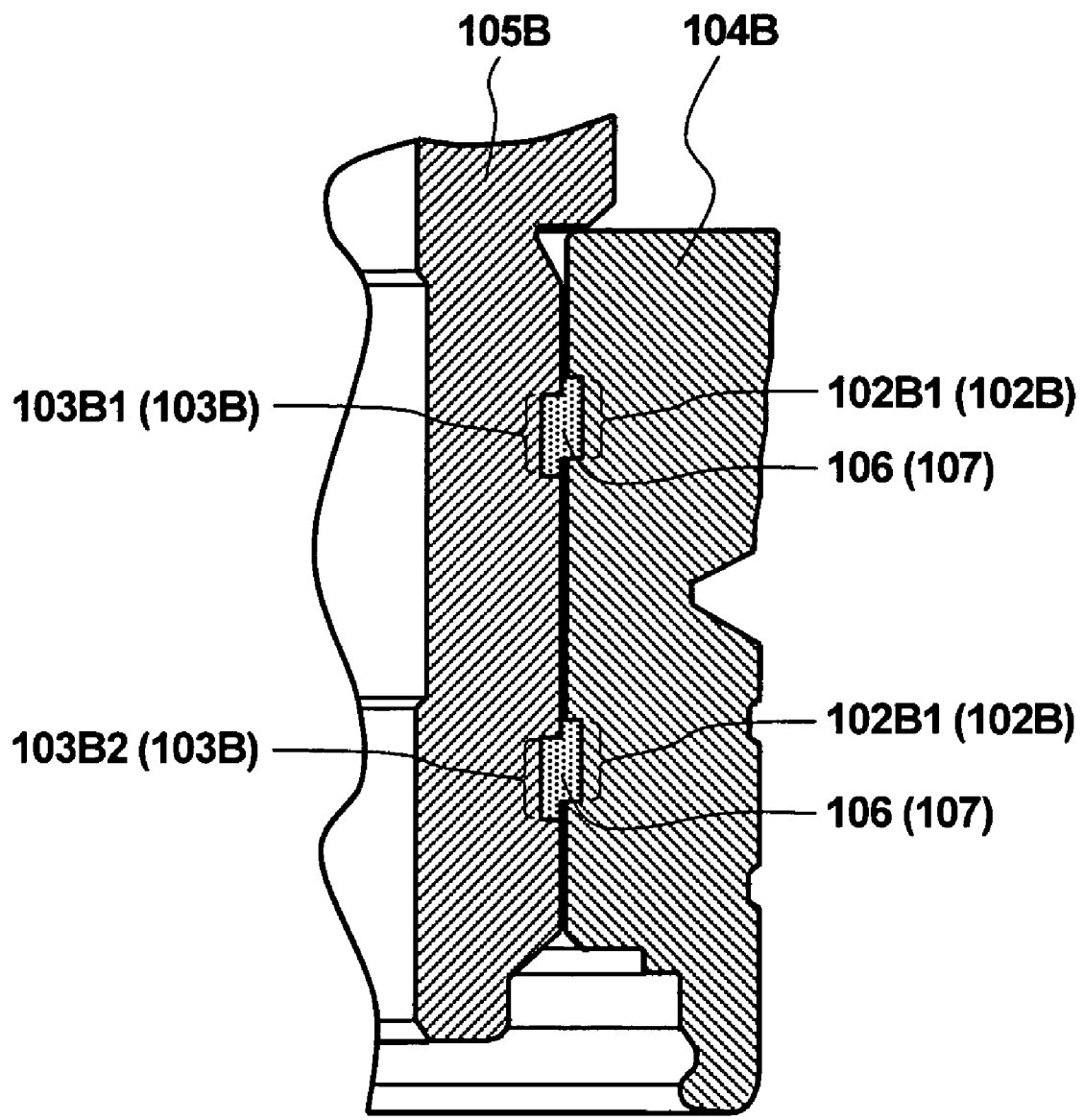
FIG. 12 is a cross sectional view of the second sleeve and the second housing shown in FIGS. 11a and 11b, which are fixed integrally by adhesive.

FIG. 9b is a perspective view in part of a housing 4H having an axial groove in a ragged cross section according to a fourth variation of the present invention.

In FIG. 8a, the housing 4E is provided with an axial groove 4Ejm in an arc shape formed on an inner circumferential surface. On the other hand, as shown in FIG. 8b, the housing 4F is provided with a circumferential groove 4Fsm in an arc shape formed on an inner circumferential surface.

Further, in order to improve an anchor effect of the adhesive, it is more preferable for a groove that a ragged surface is formed on an inner wall surface of the groove. As shown in FIG. 9a, the housing 4G is provided with a circumferential groove 4Gsm, which is composed of two horizontal edge lines 4Gsm1 and 4Gsm2 formed on the inner wall surface of the circumferential groove 4Gsm.

On the other hand, as shown in FIG. 9b, the housing 4H is provided with an axial groove 4Hjm, which is composed of two vertical edge lines 4Hjm1 and 4Hjm2.

By the configuration of the groove 4Gsm or 4Hjm having edge lines, the circumferential groove 4Gsm exhibits excellent anchor effect in the axial direction along the central axis CL. On the other hand, the axial groove 4Hjm exhibits excellent anchor effect in the circumferential direction.

In addition thereto, it will be apparent to those skilled in the art that various modifications and variations could be made in the bearing device and the motor mounted with the bearing device in the present invention without departing from the scope of the invention.

What is claimed is:

1. A bearing device comprising:
   a shaft;
   a sleeve for supporting the shaft so as to be rotatable freely; and
   a housing having a through hole into which the sleeve is inserted,
   wherein a circumferential groove extending in a circumferential direction is formed on either one surface of an outer circumferential surface of the sleeve and an inner circumferential surface of the housing that confronts with the outer circumferential surface of the sleeve, and
   wherein a gap is provided between the circumferential groove and a circumferential surface confronting with the circumferential groove, and
   wherein an axial groove that extends approximately in parallel to a central axis of the sleeve is formed on either one surface of the outer circumferential surface of the sleeve and the inner circumferential surface of the housing, and
   wherein a gap is provided between the axial groove and a circumferential surface confronting with the axial groove, and
   further wherein the outer circumferential surface of the sleeve is glued to the inner circumferential surface of the housing by adhesive that intervenes in both the circumferential groove and the axial groove.

2. The bearing device as claimed in claim 1,
   wherein the circumferential groove is formed on either one surface of the outer circumferential surface of the sleeve and the inner circumferential surface of the housing, and
   wherein the axial grove is formed on the other surface other than the surface formed with the circumferential groove.

3. A motor comprising:
   a shaft;
   a stator including a sleeve for supporting the shaft so as to be rotatable freely and a housing having a through hole into which the sleeve is inserted; and a rotor having a hub to be fixed to the shaft being supported through the shaft so as to be rotatable freely with respect to the stator, wherein a circumferential groove extending in a circumferential direction is formed on either one surface of an outer circumferential surface of the sleeve and an inner circumferential surface of the housing that confronts with the outer circumferential surface of the sleeve, and wherein a gap is provided between the circumferential groove and a circumferential surface confronting with the circumferential groove, and wherein an axial groove that extends approximately in parallel to a central axis of the sleeve is formed on either one surface of the outer circumferential surface of the sleeve and the inner circumferential surface of the housing, and, and wherein a gap is provided between the axial groove and a circumferential surface confronting with the axial groove, and further wherein the outer circumferential surface of the sleeve is glued to the inner circumferential surface of the housing by adhesive that intervenes in both the circumferential groove and the axial groove.

4. The motor as claimed in claim 3,
wherein the circumferential groove is formed on either one surface of the outer circumferential surface of the sleeve and the inner circumferential surface of the housing, and
wherein the axial grove is formed on the other surface other than the surface formed with the circumferential groove.

5. The motor as claimed in claim 3, wherein the circumferential groove is formed with a ragged surface having an edge line in the circumferential direction on an inner wall surface of the circumferential groove.

6. The motor as claimed in claim 3,
wherein the axial groove is formed with a ragged surface having a vertical edge line in parallel with a central axis of the sleeve on an inner wall surface of the axial groove.

* * * * *